United States Patent
Lukac

(10) Patent No.: US 10,043,252 B2
(45) Date of Patent: Aug. 7, 2018

(54) ADAPTIVE FILTERING WITH WEIGHT ANALYSIS

(71) Applicant: Intel Corporation, Santa Clara, CA (US)

(72) Inventor: Rastislav Lukac, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 15/182,258

(22) Filed: Jun. 14, 2016

(65) Prior Publication Data
US 2017/0358065 A1 Dec. 14, 2017

(51) Int. Cl.
*G06K 9/00* (2006.01)
*G06T 5/20* (2006.01)
*G06T 5/00* (2006.01)

(52) U.S. Cl.
CPC .............. *G06T 5/20* (2013.01); *G06T 5/002* (2013.01); *G06T 2207/20004* (2013.01); *G06T 2207/20024* (2013.01); *G06T 2207/20182* (2013.01); *G06T 2207/20192* (2013.01)

(58) Field of Classification Search
CPC . G06T 5/002; G06T 2207/20192; G06T 5/20; G06T 2207/20012; G06T 2207/20021; G06T 2207/20182; G06T 5/003; G06K 9/40
See application file for complete search history.

(56) References Cited

U.S. PATENT DOCUMENTS

| | | | |
|---|---|---|---|
| 7,171,057 B1 | 1/2007 | Wilensky et al. | |
| 8,050,509 B2 * | 11/2011 | Jeong | G06K 9/40 382/254 |
| 8,472,724 B2 * | 6/2013 | Lertrattanapanich | G06T 5/002 382/205 |
| 2005/0128355 A1 * | 6/2005 | Kang | H04N 5/144 348/606 |
| 2006/0039624 A1 * | 2/2006 | Kong | G06T 5/20 382/274 |
| 2007/0217566 A1 * | 9/2007 | Chen | G01N 23/046 378/4 |
| 2007/0296871 A1 * | 12/2007 | Yoo | G06T 5/20 348/701 |
| 2009/0087121 A1 * | 4/2009 | Han | G06T 5/002 382/266 |
| 2009/0175560 A1 * | 7/2009 | Lukac | G06T 3/4007 382/298 |

(Continued)

FOREIGN PATENT DOCUMENTS

KR 20140066017 5/2014

OTHER PUBLICATIONS

International Search Report and Written Opinion for International Patent Application No. PCT/US2015/044735, dated Nov. 30, 2015, 8 pages.

(Continued)

*Primary Examiner* — Li Liu
(74) *Attorney, Agent, or Firm* — Jordan IP Law, LLC

(57) ABSTRACT

Methods, apparatuses and systems may provide for applying an image to a filter, wherein the filter includes data-adaptive weights. Additionally, an output scaling factor may be determined based on one or more statistical operators applied to the data-adaptive weights and the output scaling factor may be applied to an output of the filter.

25 Claims, 3 Drawing Sheets

(56) References Cited

U.S. PATENT DOCUMENTS

| | | |
|---|---|---|
| 2011/0142368 A1 | 6/2011 | Shin et al. |
| 2013/0322782 A1* | 12/2013 | Chen .................. G06T 5/10 382/275 |
| 2014/0064615 A1 | 3/2014 | Ren et al. |
| 2014/0139706 A1 | 5/2014 | Jang et al. |
| 2014/0226905 A1 | 8/2014 | Yahata et al. |
| 2016/0086317 A1 | 3/2016 | Oron et al. |

OTHER PUBLICATIONS

Notice of Allowance for U.S. Appl. No. 14/494,163, dated Jul. 8, 2016, 12 pages.

Buades, A., et al., "A non-local algorithm for image denoising," IEEE Computer Society Conference on Computer Vision and Pattern Recognition, 2005, vol. 2, 6 pages.

Dahl, A., et al., "Texture Segmentation by Contractive Decomposition and Planar Grouping," Proceedings of the 7th IAPR-TC-15 International Workshop on Graph-Based Representations in Pattern Recognition, 2009, 10 pages.

Todorovic, S., et al., "Texel-based Texture Segmentation," Proceedings of IEEE International Conference on Computer Vision (ICCV), Kyoto, Japan, 2009, 8 pages.

Buades, A., et al., "On image denoising methods," Technical Report, CMLA, 2004, 40 pages.

Salmon, J., et al., "From patches to pixels in non-local methods: weighted-average reprojection," 17th IEEE International Conference on Image Processing (ICIP), 2010, 4 pages.

Mairal, J., et al., "Non-local sparse models for image restoration," Computer Vision, 2009 IEEE 12th International Conference on. IEEE, 2009, 41 pages.

* cited by examiner

ADAPTIVE FILTERING WITH WEIGHT ANALYSIS

BACKGROUND

Image filtering may be used to suppress noise in still images, video frames and other digital content. For example, conventional image filters may evaluate the differences between each pixel and its neighboring pixels and use an exponential function to convert the differences into data-adaptive weights. The data-adaptive weights may then be applied to the values of the pixels inside the pixel neighborhood to determine the filtered value of the pixel at the center of the neighborhood. The appearance and/or visibility of noise, however, in a given image may be dependent on the image content (e.g., whether the image contains flat areas, edges, textures, etc.) and the brightness of image regions. Accordingly, conventional image filters may vary the filter output based on the image content characteristics, the pixel intensity and/or the distance from the optical center (e.g., to reflect lens shading characteristics) in order to improve the noise reduction results. Notwithstanding, conventional image filters may still either perform excessive smoothing (e.g., resulting in blurring and loss of details) in edge and texture regions where noise visibility is relatively low or perform insufficient smoothing (e.g., resulting in the presence of noise) in flat regions where noise visibility is relatively high.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Data-Adaptive Weights

As already noted, the differences between each pixel in an image and its neighboring pixels may be evaluated and converted by an exponential function into data-adaptive weights. The data-adaptive weights may then be applied to the values of the pixels inside the pixel neighborhood to determine the filtered value of the pixel at the center of the neighborhood.

The pixel differences may be normalized using noise variance (e.g., modelled as a function of a pixel value). The differences may be further scaled to reflect the image content characteristics (scaling value calculated based on image statistics), design choice (predetermined scaling value), or user preference (scaling value controlled through an interface). Thus, the weights might be calculated as $w=\exp(-kd/v)$ where k is a scaling value, d is the difference between the actual pixel (or a block associated with the actual pixel) and its neighbor (or a block associated with a neighboring pixel), and v is a normalization value. The maximum weight $w=1$ may be obtained when d is zero, and close to zero weights are produced when $kd/v$ is a large value. The weight associated with the pixel at the center of the neighborhood typically has the maximum value.

The filter output $y=\text{sum}(w_i x_i)/\text{sum}(w_i)$, for $i=1, 2, 3, \ldots, N$, may be calculated as a weighted average of all the pixels $x_i$ inside a filter window (with the actual pixel $x=x_{(N+1)/2}$ usually located at the window center). The difference between the actual pixel x and the filter output y, may be reduced by adding the filter output and the scaled version of x−y. Thus, an updated filter output may be obtained as $y'=y+a(x-y)$ or equivalently as $y'=(1-a)y+ax$, where a is an output scaling factor. In such a case, using $a=0$ does not alter the filter output (i.e., no reduction of the difference x−y), whereas using $a=1$ results in the original noisy signal x (i.e., no smoothing). Thus, setting the output scaling factor between zero and one may help to achieve a trade-off between the noise reduction and signal-detail preservation. As will be discussed in greater detail, the value of the output scaling factor may be adaptively adjusted in each pixel location based on a filter weight analysis in order to further improve filtering performance.

Adaptive Filtering with Weight Analysis

Figure 1:
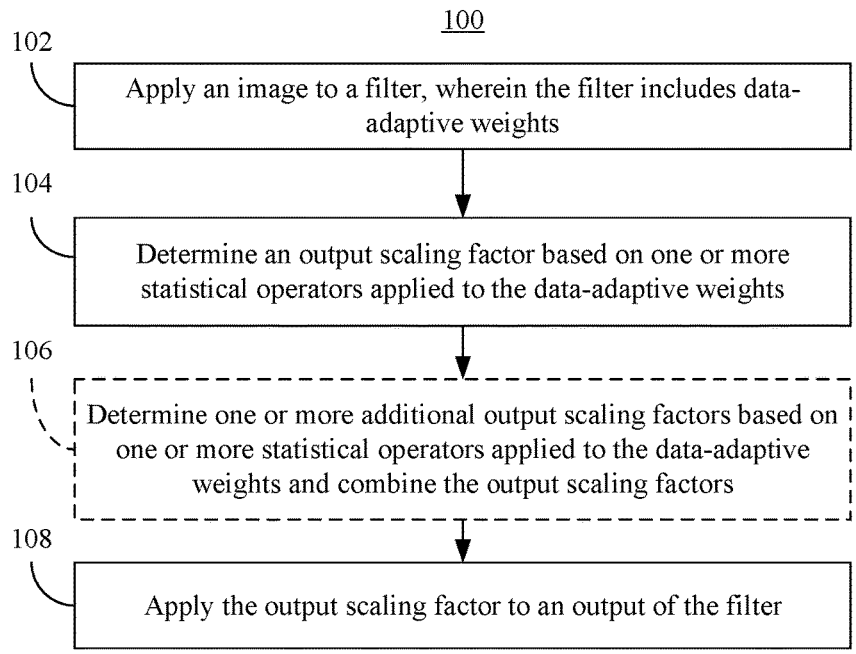
FIG. 1 is a flowchart of an example of a method of operating a noise reduction subsystem apparatus according to an embodiment.

Turning now to FIG. 1, a method 100 of operating a noise reduction subsystem apparatus is shown. The method 100 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 102 provides applying an image to a filter, wherein the filter includes data-adaptive weights. Additionally, an output scaling factor may be determined at block 104 by applying one or more statistical operators to the data-adaptive weights. The output scaling factor may be determined as, for example, using the mean, maximum, maximum, median, standard deviation, variance, etc. or any combination thereof. Moreover, the output scaling factor may be determined on a per filter window basis in each instance.

In one example, the scaling factor a is calculated as a mean of all filter weights $w_i$, for $i=1, 2, 3, \ldots, N$. Under this approach, the maximum smoothing/averaging may be produced when all the weights are set identically. In practice, data-adaptive filtering with very small $kd/v$ values for all the pixels inside the filter window produces very similar smoothing effects as the mean filter. Since the weight associated with the actual pixel (window center) is usually equal to one in the above definition (since the corresponding pixel difference is equal to zero), data-adaptive filtering becomes mathematically equivalent to the local mean filter if all the weights are set to one, resulting in $\text{sum}(w_i)=N$. Thus, the level of smoothing performed by the data-adaptive filter may be expressed as $\text{sum}(w_i)/N$ or equivalently using the neighboring pixels as $a=1-\text{sum}(w_i)/(N-1)$ for $i=1, 2, 3, \ldots, N$ and $i \neq (N+1)/2$). Since the goal here may be to reduce the difference between the actual pixel x and the filter output y, an adaptive factor for scaling x−y may be calculated as $a=1-\text{sum}(w_i)/N$. Considering the definition of the updated filter output y'=(1−a)y+ax, this approach effectively mixes the two signals with a larger contribution of the noisy input x when aggressive smoothing was already applied through large data-adaptive filter weights $w_i$ and a smaller contribution of x when filtering was already preserving edges.

In another example, the output scaling factor a is calculated as a function of the maximum weight value associated with the neighboring samples inside the filter window. Since the weight associated with the actual sample $x=x_{(N+1)/2}$ may always be equal to one, it may be ignored/excluded in order to determine a true data-adaptive maximum weight. Therefore, the maximum weight $w_{max}$ is determined here as $w_{max}=\max\{w_i; i=1, 2, 3, \ldots, N; i\neq(N+1)/2\}$. Alternatively, $w_{max}$ may be calculated as the second maximum weight when the weight associated with the actual sample $x=x_{(N+1)/2}$ is not excluded from consideration. If $w_{max}$ is close to one, then there may be a good chance that the data-adaptive filter is edge-preserving since there is at least one pixel in its local neighborhood which is very similar to the actual pixel. Therefore, it is possible to use the maximum weight subtracted from one, resulting in the output scaling factor $a=1-w_{max}$.

In another example, the maximum weight is compared with the sum of weights associated with the neighboring pixels to determine how much the most similar pixel inside a local neighborhood is contributing to the filter output relative to other neighboring pixels. Thus, the output scaling factor may be expressed as $a=w_{max}/(\text{sum}(w_i))$, for $i=1, 2, 3, \ldots, N$ and $i\neq(N+1)/2$. Equivalently, the output scaling factor $a=w_{max}/(\text{sum}(w_i)-1)$, for $i=1, 2, 3, \ldots, N$, may be defined here as the ratio between the maximum weight and the sum of weights reduced by one to ignore the weight (always equal to one) associated with the actual pixel. Alternatively, in case of data-adaptive filtering where the weight associated with the actual pixel (usually the window center) does not reach the maximum allowed weight value (e.g., when d represents the cumulated difference with respect to all neighboring pixels and/or when different weighting function is used), the output scaling factor may be expressed as $a=w_{max}/(\text{sum}(w_i))$, for $i=1, 2, 3, \ldots, N$. The larger ratio values indicate the presence of edges, whereas the small ratio values indicate the flat fields where a higher number of similar pixels to the actual pixel can be found.

In another example, the output scaling factor a is calculated as a function of the minimum and maximum weights. As before, the maximum weight $w_{max}$ is determined from the set of weights which exclude the weight $w_{(N+1)/2}$ associated with the actual pixel (window center). Since $w_{(N+1)/2}=1$, this exclusion is not necessary when determining the minimum weight, and thus $w_{min}=\min\{w_i; i=1, 2, 3, \ldots, N\}=\min\{w_i; i=1, 2, 3, \ldots, N; i\neq(N+1)/2\}$. The comparison of these two extreme weights gives an indication about the filter performance, since $w_{min}$ and $w_{max}$ should be similar when aggressive smoothing is applied and different when the filter is detail-preserving. Therefore, the output scaling factor a may be calculated as $a=1-w_{min}/w_{max}$.

In another example, the weights $\{w_i; i=1, 2, 3, \ldots, N; i\neq(N+1)/2\}$ associated with the neighboring pixels inside the filter window are ordered to create an ordered set $\{w(i); i=1, 2, 3, \ldots, N-1; w_{(i)}\leq w_{(i+1)}\}$ where the bracketed term (i) denotes the index of the sample in the ordered set. Following the rationales of the previous embodiments, $w_{min}$ and $w_{max}$ may be replaced with w(m) and w(n), where m and n, for m<n, are design parameters.

In another example, a deviation from a suitable value of k for scaling the normalized pixel differences d/v in the exponential function is compensated through an adjustment applied to the output scaling factor a. For instance, if this deviation is expressed in the form of a ratio between the actual value of k and its optimized or calibrated setting, the output scaling factor a may be adjusted with a factor calculated as a function of this ratio (for instance, an inverse ratio).

Illustrated block 106 optionally determines one or more additional output scaling factors based on one or more statistical operators and combines the additional output scaling factor(s) with the output scaling factor determined at block 104. Accordingly, block 106 may adapt the output scaling factor based on one or more additional determinations that incorporate the data-adaptive weights. Thus, values of the output scaling factor calculated using two or more approaches described in this disclosure may be combined to obtain a scaling value with a stronger discrimination power between the noise and the edge information.

Suitable approaches to combining these values include, but are not limited to, multiplication (since the output scaling factor may be restricted between zero and one), averaging, weighted averaging, etc. Any original or combined output scaling factor may be further adjusted using some predetermined function (e.g., power function), by limiting its range, by multiplying it with some user-controlled parameter, by adding some offset to it, and/or by combining it with the calibrated image-content-based parameters, pixel-intensity based parameters, and/or the parameters characterizing the distance from the optical center. Other suitable adjustments may include the use of image-based parameters other than the data-adaptive weights; for instance, various local and global image statistics and image features, histograms, gradient information, edge directionality, normalization parameters, etc. Some variants of this approach may permit the replacement of the minimum weight with the mean or median weight, or some other suitable statistics, such as the trimmed mean or weighted average weight value. Similarly, some meaningful statistical replacements, such as the average of several largest weights may be used instead of the maximum weight. In some cases, the weights may be subject to upper- or lower-bound thresholding prior to calculating the output scaling value(s). Block 106 may involve either using a single output scaling factor or a combination of multiple different output scaling factors to obtain the final output scaling factor. Block 108 may apply the final output scaling factor to an output of the filter.

Moreover, the techniques described herein are not limited to the use of absolute or square differences between the actual pixel (or a block associated with the actual pixel) and its neighbors (or a block associated with a neighboring pixel), nor the use of the exponential function for mapping these differences to the weight values. Both of these design elements are considered here only for illustrative purposes. The solutions proposed herein may be practiced in conjunction with various distance or similarity measures to quantify pixel differences and various functions to calculate the weights. Similarly, the solutions described herein are applicable to a subset of neighboring pixels chosen according to some predetermined criterion. For example, a set of several pixels with smallest pixel differences, pixels with differences smaller than a predetermined or adaptively calculated threshold, etc., may be used.

Figure 2:
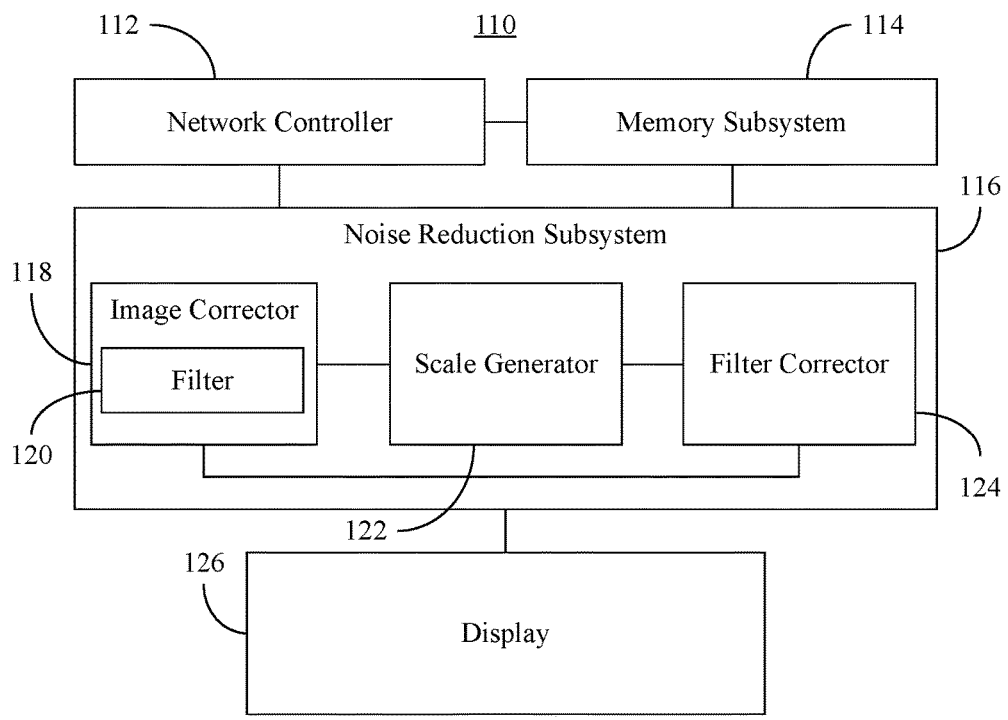
FIG. 2 is a block diagram of an example of an image presentation system according to an embodiment.

Turning now to FIG. 2, an image presentation system 110 is shown. The illustrated system 110 includes a network controller 112 (e.g., wireless and/or wired communication interface) to obtain images, a memory subsystem 114 (e.g., cache, registers, system memory, non-volatile memory/ NVM, flash memory) to store the images and a noise reduction subsystem 116 communicatively coupled to the network controller 112 and the memory subsystem 114. The noise reduction subsystem 116 may generally implement one or more aspects of the method 100 (FIG. 1), already discussed. More particularly, the noise reduction subsystem 116 may include an image corrector 118 to apply the images to a filter 120, wherein the filter 120 includes data-adaptive weights. Additionally, a scale generator 122 may be communicatively coupled to the image corrector 118, wherein the scale generator 122 determines output scaling factors based on one or more of the data-adaptive weights.

The output scaling factors may be determined as a function of a subset of filter weights on a per filter window basis, wherein the subset may consist of a maximum weight exclusive of a target pixel in the filter window, a minimum weight, etc., or any combination thereof. The output scaling factors may also be determined as a standard deviation of filter weights, a variance of filter weights, a histogram of filter weights, a deviation of one or more weight scaling values from a predetermined scaling value, and so forth. In yet another example, the output scaling factors may be determined as an average function of all filter weights on a per filter window basis. Moreover, the scale generator 122 may adapt the output scaling factors based on one or more additional determinations that incorporate the data-adaptive weights. The noise reduction subsystem 116 may also include a filter corrector 124 communicatively coupled to the scale generator 122 and the image corrector 118, wherein the filter corrector applies the output scaling factors to an output of the filter 120. A display 126 may visually present the filtered images.

Figure 3:
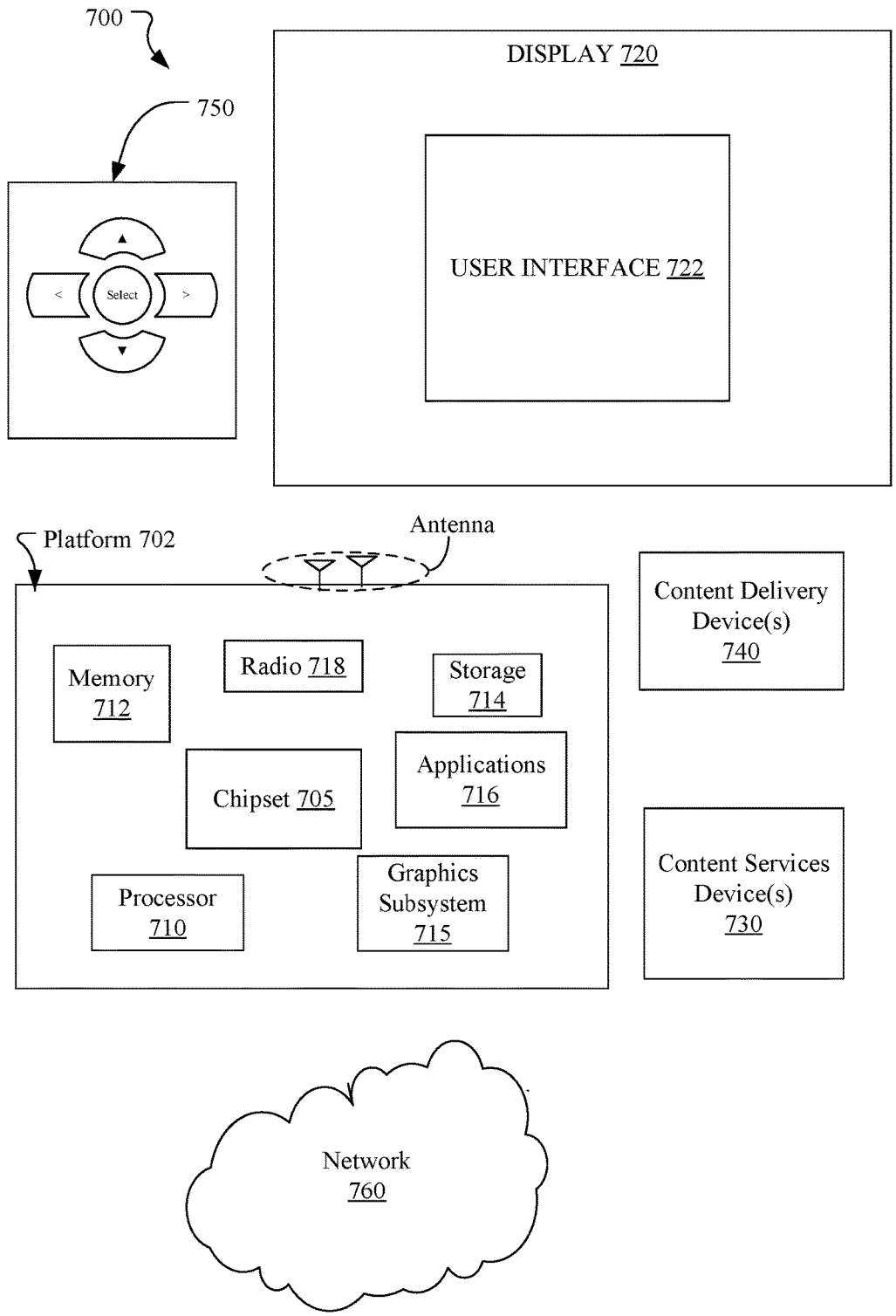
FIG. 3 is a block diagram of an example of a system having a navigation controller according to an embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/ or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
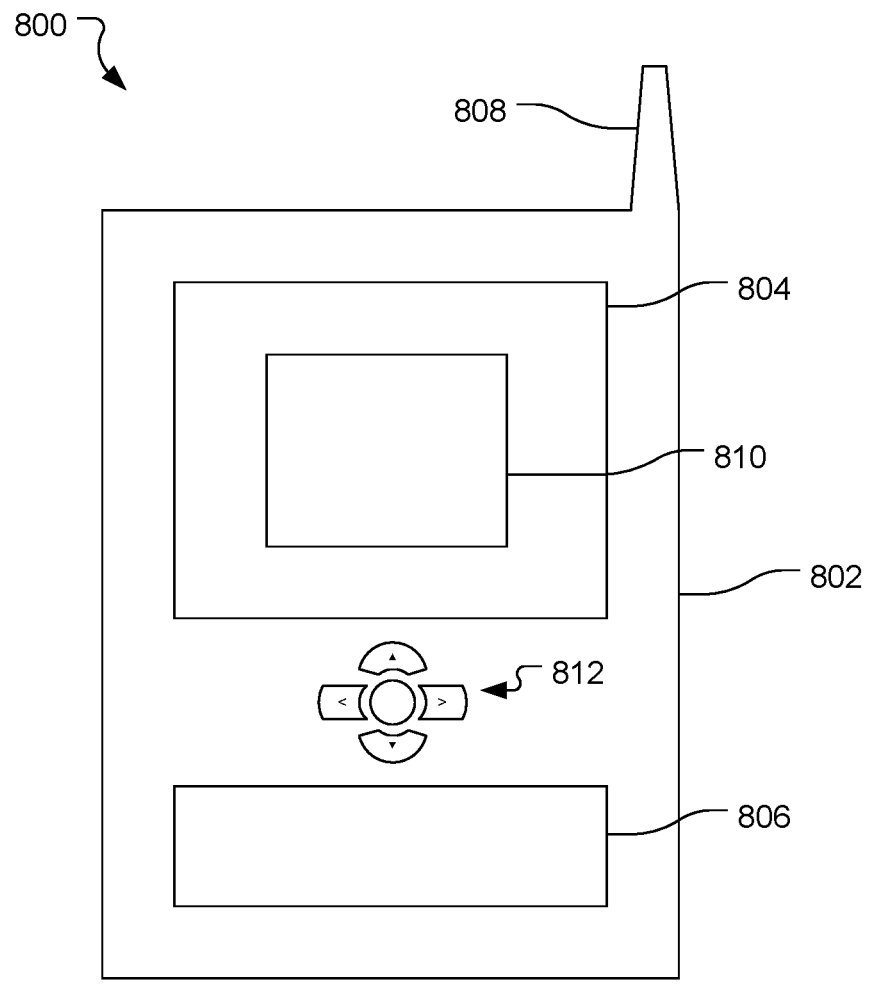
FIG. 4 is a block diagram of an example of a system having a small form factor according to an embodiment.

As described above, the system 700 may be embodied in varying physical styles or form factors. FIG. 4 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

ADDITIONAL NOTES AND EXAMPLES

Example 1 may include a noise reduction apparatus comprising an image corrector to apply an image to a filter, wherein the filter is to include data-adaptive weights, a scale generator communicatively coupled to the image corrector, the scale generator to determine an output scaling factor based on one or more statistical operators applied to the data-adaptive weights, and a filter corrector communicatively coupled to the image corrector and the scale generator, the filter corrector to apply the output scaling factor to an output of the filter.

Example 2 may include the apparatus of Example 1, wherein the output scaling factor is to be determined as a function of a mean of filter weights on a per filter window basis.

Example 3 may include the apparatus of claim 2, wherein calculating the mean excludes a weight associated with an actual pixel or a pixel located in a center of the filter window.

Example 4 may include the apparatus of Example 2, wherein the mean is substituted by an operation selected from a group consisting of a weighted average, a trimmed mean, and a median.

Example 5 may include the apparatus of Example 1, wherein the output scaling factor is to be determined as a function of a maximum weight on a per filter window basis.

Example 6 may include the apparatus of Example 5, wherein the maximum weight is to be substituted by a non-maximum weight.

Example 7 may include the apparatus of Example 1, wherein the output scaling factor is to be determined as a function of a ratio of a maximum weight exclusive of a target pixel on a per filter window basis and a sum of weights associated with pixels inside the filter window.

Example 8 may include the apparatus of Example 1, wherein the output scaling factor is to be determined as a function of a ratio of a minimum weight and a maximum weight.

Example 9 may include the apparatus of Example 7, wherein the minimum weight is to be substituted by a non-minimum weight and/or the maximum weight is to be substituted by a non-maximum weight.

Example 10 may include the apparatus of Example 1, wherein the output scaling factor is to be determined as a function of a value selected from a group consisting of a standard deviation of filter weights, a variance of filter weights, and a deviation of one or more weight scaling values from a predetermined scaling value.

Example 11 may include the apparatus of claim 1, wherein the output scaling factor is further adjusted using one or more elements selected from a group consisting of a predetermined function, a user-controlled parameter, image-based parameters other than the data-adaptive weights, and calibrated parameters reflecting one or more of image sensor, optics, and/or imaging system characteristics.

Example 12 may include the apparatus of any one of Examples 1 to 9, wherein the output scaling factor is a first output scaling factor and the scale generator is to determine a second output scaling factor based on one or more statistical operators applied to the data-adaptive weights, and wherein the filter corrector is to apply a combination of the first output scaling factor and the second output scaling factor to the output of the filter.

Example 13 may include the apparatus of any one of Examples 1 to 9, further including a network controller to obtain the image, and a memory subsystem to store the image.

Example 14 may include a method of operating a noise reduction apparatus, comprising applying an image to a filter, wherein the filter includes data-adaptive weights, determining an output scaling factor based on one or more statistical operators applied to the data-adaptive weights, and applying the output scaling factor to an output of the filter.

Example 15 may include the method of Example 14, wherein the output scaling factor is determined as a function of a mean of filter weights on a per filter window basis.

Example 16 may include the method of Example 14, wherein the output scaling factor is determined as a function of a maximum weight on a per filter window basis.

Example 17 may include the method of claim 14, wherein the output scaling factor is a combination of at least two intermediate scaling factors, each of the intermediate scaling factors determined based on one or more statistical operators applied to the filter weights on a per filter window basis.

Example 18 may include at least one computer readable storage medium comprising a set of instructions, which when executed by a computing device, cause the computing device to apply an image to a filter, wherein the filter is to include data-adaptive weights, determine an output scaling factor based on one or more statistical operators applied to the data-adaptive weights, and apply the output scaling factor to an output of the filter.

Example 19 may include the at least one computer readable storage medium of Example 18, wherein the output scaling factor is to be determined as a function of a mean of filter weights on a per filter window basis.

Example 20 may include the at least one computer readable storage medium of Example 19, wherein the mean is substituted by an operation selected from a group consisting of a weighted average, a trimmed mean, and a median.

Example 21 may include the at least one computer readable storage medium of claim 18, wherein the output scaling factor is to be determined as a function of one value selected from the group consisting of a maximum weight, a second maximum weight, a third maximum weight, or some other non-maximum weight on a per filter window basis.

Example 22 may include the at least one computer readable storage medium of Example 18, wherein the output scaling factor is to be determined as a function of a ratio of a maximum weight exclusive of a target pixel on a per filter window basis and a sum of weights associated with pixels inside the filter window.

Example 23 may include the at least one computer readable storage medium of Example 18, wherein the output scaling factor is to be determined as a function of a ratio of a minimum weight and a maximum weight.

Example 24 may include the at least one computer readable storage medium of Example 18, wherein the output scaling factor is to be determined as a function of a value selected from a group consisting of a standard deviation of filter weights, a variance of filter weights, and a deviation of one or more weight scaling values from a predetermined scaling value.

Example 25 may include the at least one computer readable storage medium of any one of Examples 16 to 24, wherein the output scaling factor is a first output scaling factor and the instructions, when executed, cause the computing device to determine a second output scaling factor based on one or more statistical operators applied to the data-adaptive weights, and apply a combination of the first output scaling factor and the second output scaling factor to the output of the filter.

Example 26 may include a noise reduction apparatus comprising means for applying an image to a filter, wherein the filter is to include data-adaptive weights; means for determining an output scaling factor based on one or more statistical operators applied to the data-adaptive weights; and means for applying the output scaling factor to an output of the filter.

Example 27 may include the apparatus of claim 25, wherein the output scaling factor is to be determined as a function of a mean of filter weights on a per filter window basis.

Example 28 may include the apparatus of claim 25, wherein the output scaling factor is to be determined as a function of a maximum weight on a per filter window basis.

Example 29 may include the apparatus of claim 25, wherein the output scaling factor is a combination of at least two intermediate scaling factors, each of the intermediate scaling factors determined based on one or more statistical operators applied to the filter weights on a per filter window basis.

Techniques described herein may therefore provide an effective, computationally efficient and flexible solution that accommodates various design and implementation requirements. Using these solutions may help to avoid time-consuming parameter calibration and filter weight recalculations in order to produce better results. Moreover, the techniques described herein may simplify both the design and analysis of data-adaptive filters.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

I claim:

1. An apparatus comprising:
an image corrector to apply an image to a filter, wherein the filter is to include data-adaptive weights;
a scale generator communicatively coupled to the image corrector, the scale generator to determine an output scaling factor based on one or more statistical operators applied to the data-adaptive weights, wherein the output scaling factor is to be determined as a function of a mean of filter weights on a per filter window basis; and
a filter corrector communicatively coupled to the image corrector and the scale generator, the filter corrector to apply the output scaling factor to an output of the filter.

2. The apparatus of claim 1, wherein calculating the mean excludes a weight associated with an actual pixel or a pixel located in a center of the filter window.

3. The apparatus of claim 1, wherein the scale generator is to determine one or more output scaling factors based on an operation selected from a group consisting of a weighted average, a trimmed mean, and/or a median.

4. The apparatus of claim 1, wherein the scale generator is to determine one or more output scaling factors as a function of a maximum weight on a per filter window basis.

5. The apparatus of claim 1, wherein the scale generator is to determine one or more scaling factors based on a non-maximum weight.

6. The apparatus of claim 1, wherein the scale generator is to determine one or more output scaling factors as a function of a ratio of a maximum weight exclusive of a target pixel on a per filter window basis and a sum of weights associated with pixels inside the filter window.

7. The apparatus of claim 1, wherein the scale generator is to determine one or more output scaling factors as a function of a ratio of a minimum weight and a maximum weight.

8. The apparatus of claim 1, wherein the scale generator is to determine one or more output scaling factors based on a non-minimum weight and/or a non-maximum weight.

9. The apparatus of claim 1, wherein the scale generator is to determine one or more output scaling factors as a function of a value selected from a group consisting of a standard deviation of filter weights, a variance of filter weights, and/or a deviation of one or more weight scaling values from a predetermined scaling value.

10. The apparatus of claim 1, wherein the scale generator is to determine one or more output scaling factors based on one or more elements selected from a group consisting of a predetermined function, a user-controlled parameter, image-based parameters other than the data-adaptive weights, and calibrated parameters reflecting one or more of image sensor, optics, and/or imaging system characteristics.

11. The apparatus of claim 1, wherein the output scaling factor is a first output scaling factor and the scale generator is to determine a second output scaling factor based on one or more statistical operators applied to the data-adaptive weights, and wherein the filter corrector is to apply a combination of the first output scaling factor and the second output scaling factor to the output of the filter.

12. The apparatus of claim 1, further including:
a network controller to obtain the image; and
a memory subsystem to store the image.

13. A method comprising:
applying an image to a filter, wherein the filter includes data-adaptive weights;
determining an output scaling factor based on one or more statistical operators applied to the data-adaptive weights, wherein the output scaling factor is determined as a function of a mean of filter weights on a per filter window basis; and
applying the output scaling factor to an output of the filter.

14. The method of claim 13, further including determining one or more output scaling factors as a function of a maximum weight on a per filter window basis.

15. The method of claim 13, wherein the output scaling factor is a combination of at least two intermediate scaling factors, each of the intermediate scaling factors determined based on one or more statistical operators applied to the filter weights on a per filter window basis.

16. At least one non-transitory computer readable storage medium encoded with a set of instructions, which when executed by a computing device, cause the computing device to:
apply an image to a filter, wherein the filter is to include data-adaptive weights;
determine an output scaling factor based on one or more statistical operators applied to the data-adaptive weights, wherein the output scaling factor is to be determined as a function of a mean of filter weights on a per filter window basis; and
apply the output scaling factor to an output of the filter.

17. The at least one computer readable storage medium of claim 16, wherein the instructions, when executed, cause the computing device to determine one or more scaling factors based on an operation selected from a group consisting of a weighted average, a trimmed mean, and/or a median.

18. The at least one computer readable storage medium of claim 16, wherein the instructions, when executed, cause the computing device to determine one or more output scaling factors as a function of a value selected from the group consisting of a maximum weight, a second maximum weight, a third maximum weight, and/or some other non-maximum weight on a per filter window basis.

19. The at least one computer readable storage medium of claim 16, wherein the instructions, when executed, cause the computing device to determine one or more output scaling factors as a function of a ratio of a maximum weight exclusive of a target pixel on a per filter window basis and a sum of weights associated with pixels inside the filter window.

20. The at least one computer readable storage medium of claim 16, wherein the instructions, when executed, cause the computing device to determine one or more output scaling factors as a function of a ratio of a minimum weight and a maximum weight.

21. The at least one computer readable storage medium of claim 16, wherein the instructions, when executed, cause the computing device to determine one or more output scaling factors as a function of a value selected from a group consisting of a standard deviation of filter weights, a variance of filter weights, and/or a deviation of one or more weight scaling values from a predetermined scaling value.

22. The at least one computer readable storage medium of claim 16, wherein the output scaling factor is a first output scaling factor and the instructions, when executed, cause the computing device to:
determine a second output scaling factor based on one or more statistical operators applied to the data-adaptive weights; and
apply a combination of the first output scaling factor and the second output scaling factor to the output of the filter.

23. An apparatus comprising:
an image corrector to apply an image to a filter, wherein the filter is to include data-adaptive weights;
a scale generator communicatively coupled to the image corrector, the scale generator to determine an output scaling factor based on one or more statistical operators applied to the data-adaptive weights, wherein the output scaling factor is to be determined as a function of a maximum weight on a per filter window basis; and
a filter corrector communicatively coupled to the image corrector and the scale generator, the filter corrector to apply the output scaling factor to an output of the filter.

24. An apparatus comprising:
an image corrector to apply an image to a filter, wherein the filter is to include data-adaptive weights;
a scale generator communicatively coupled to the image corrector, the scale generator to determine an output scaling factor based on one or more statistical operators applied to the data-adaptive weights, wherein the output scaling factor is to be determined as a function of a ratio of a maximum weight exclusive of a target pixel on a per filter window basis and a sum of weights associated with pixels inside the filter window; and
a filter corrector communicatively coupled to the image corrector and the scale generator, the filter corrector to apply the output scaling factor to an output of the filter.

25. An apparatus comprising:
an image corrector to apply an image to a filter, wherein the filter is to include data-adaptive weights;
a scale generator communicatively coupled to the image corrector, the scale generator to determine an output scaling factor based on one or more statistical operators applied to the data-adaptive weights, wherein the output scaling factor is to be determined as a function of a ratio of a minimum weight and a maximum weight; and
a filter corrector communicatively coupled to the image corrector and the scale generator, the filter corrector to apply the output scaling factor to an output of the filter.

* * * * *